United States Patent [19]

Allen

[11] 4,278,230
[45] Jul. 14, 1981

[54] COOLING SYSTEM FOR PLASTIC MOLDS

[75] Inventor: Paul E. Allen, Newtown, Conn.

[73] Assignee: Logic Devices, Inc., Bethel, Conn.

[21] Appl. No.: 733,812

[22] Filed: Oct. 19, 1976

Related U.S. Application Data

[63] Continuation-in-part of Ser. No. 671,043, Mar. 29, 1976, abandoned.

[51] Int. Cl.³ .................... B22D 27/04; F28F 11/00
[52] U.S. Cl. ........................................ 249/81; 165/70; 165/104.32
[58] Field of Search ............... 165/31, 107, 48, 70, 165/107 D; 417/9; 264/40.1, 40.4, 237, 348; 249/79–81

[56] References Cited

U.S. PATENT DOCUMENTS

| | | | |
|---|---|---|---|
| 2,214,053 | 9/1940 | Gwinn | 165/70 |
| 2,309,296 | 1/1943 | Bentley | 165/70 |
| 3,294,155 | 12/1966 | Biegler | 165/107 X |
| 3,525,098 | 8/1970 | Vox | 165/48 X |
| 3,565,986 | 2/1971 | Byall | 249/80 X |
| 3,816,025 | 6/1974 | O'Neill | 417/9 |

*Primary Examiner*—John McQuade
*Assistant Examiner*—John S. Brown

[57] ABSTRACT

A system for cooling plastic molds with a flowing liquid while obviating leaking of the fluid and still enabling the mold to basically determine the quantity of liquid flowing, by providing a less than atmospheric pressure within the mold and increasing where needed, the cooling effect of the flowing liquid by in effect, providing a controlled adjustable air leak.

4 Claims, 4 Drawing Figures

COOLING SYSTEM FOR PLASTIC MOLDS

The present invention is a continuation-in-part of my copending application Ser. No. 671,043 now abandoned, filed Mar. 29, 1976 and entitled "Fluid Handling Process and Apparatus".

The present invention has particular utility when used with plastic molds of the injection type in which hot liquified plastic is forced into a mold cavity, cooled and then removed from the mold as a finished article. In such an operation, it is not only necessary that satisfactory articles be produced but it is also desired that they be economically produced by requiring the shortest possible time, i.e., minimum cycle time, of the molding machine. In a typical cycle time of perhaps 30 seconds, the time for cooling may be 15 to 24 seconds with the remaining time being used for injection of the plastic material including the loading of inserts and ejection of the finished article.

Cooling is achieved in most injection molds by circulating a chilled liquid, such as water or an anti-freeze solution through closed cooling ducts formed in the mold. The ability of the liquid to extract heat basically sets the cooling time and this involves many factors including the design of the cooling ducts, the velocity of the liquid, the quantity of the cooling liquid flowing, the heat transfer characteristics between the mold and the liquid, relative temperatures and the quantity of plastic material within the article. The cooling liquid has heretofore been forced to flow through the mold by subjecting the liquid to a greater than atmospheric pressure with a typical pressure being 40 PSI with the pressure drop across the mold and the cooling duct design basically setting the maximum quantity of fluid flowing and hence the minimum cooling time.

If the fluid duct is not fluid tight, the cooling liquid, by being under a positive pressure, leaks out and makes use of the mold impossible for producing satisfactory articles should the leaked liquid encounter the path of the plastic material, such as the article molding cavity. The possibility of a leak is generally not determinable until the mold is assembled in a molding machine and the repairing of the leak involves not only the cost of actual repair of the mold but also the costs due to removal and reassembly of the mold in the molding machine, downtime of the molding machine and interrupted production schedules so that overcoming a leak has heretofore been quite an expensive procedure.

It is accordingly an object of the present invention to provide a cooling system which obviates the production of unsatisfactory articles caused by cooling liquid leaks, without alteration or repair of the mold, over a wide range of leaking conditions and kinds of molds.

Another object of the present invention is to achieve the above object with a cooling system which does not substantially increase, if at all, the cooling time of the mold and hence maintains the normal cycle time of the molding operation by basically still permitting the maximum flow of cooling liquid.

A further object of the present invention is to provide a cooling system that enables a leaking mold to produce satisfactory finished articles which is readily incorporable into most existing cooling systems and uses the same cooling system liquid, is easily connected to just the leaking portion of the mold if desired, and which is quite economical to manufacture and operate.

In carrying out the present invention, the system is intended to be interconnected with the existing plastic mold cooling system in a plant, to use the same pressurized cooling liquid. Further, it may be used just on one mold exclusively or may be used on just a portion of a mold with the remainder of the mold being connected to the plant's system. In either event, the present system is installed across the cooling ducts of the mold where leakage has been occurring and controls the flow of liquid in said cooling duct. In such leaking ducts, the system causes a less than atmospheric or negative pressure to exist which induces the flow of air through the leak into the cooling duct rather than undesired leakage of pressurized cooling liquid from the duct into the mold cavity.

The system has a feed line connected between the cooling liquid source and the feed port of the mold into which the liquid is introduced into the mold cooling duct with a pressure regulator or other structure reducing the pressure of the cooling liquid to a slightly less than atmospheric pressure at the feed port. The exit port of the mold from which the warmed liquid exits from the cooling duct is connected to the inlet of a positive displacement pump which exhausts the warmed liquid to either the source for recirculating the liquid or to a disposal drain. Both the pump and pressure regulator each have a capacity that is greater than the volume of cooling liquid that can flow through the mold and hence both permit as much cooling liquid to flow through the mold as the mold is capable of permitting while still producing in the cooling duct a negative pressure which prevents leakage of the cooling liquid. Any air that may leak into the cooling duct is passed through the pump to be discharged with the warmed liquid. Thus, the system is capable of providing essentially the normal flow of cooling liquid through the mold over a wide range of leaking conditions and hence does not especially decrease the cooling time of a molding cycle from that previously obtained by a pressurized liquid system.

In the event that the system is incapable of providing the necessary volume of cooling liquid flow to effect the desired cooling, the system provides for enhancing the cooling effect of whatever cooling liquid flows by assuring turbulence in the flowing liquid thereby increasing the heat transfer between the mold and the cooling liquid. This is effectively and simply accomplished in the present invention by the inclusion of an air valve which permits a small quantity of air to be bled into the liquid prior to the connection to the mold feed port and this induced air, together with perhaps the leaking air, creates turbulence in the flowing liquid, breaking up any laminar flow and hence increasing the heat transfer characteristics of the flowing liquid.

Other features and advantages will hereinafter appear.

Figure 1:
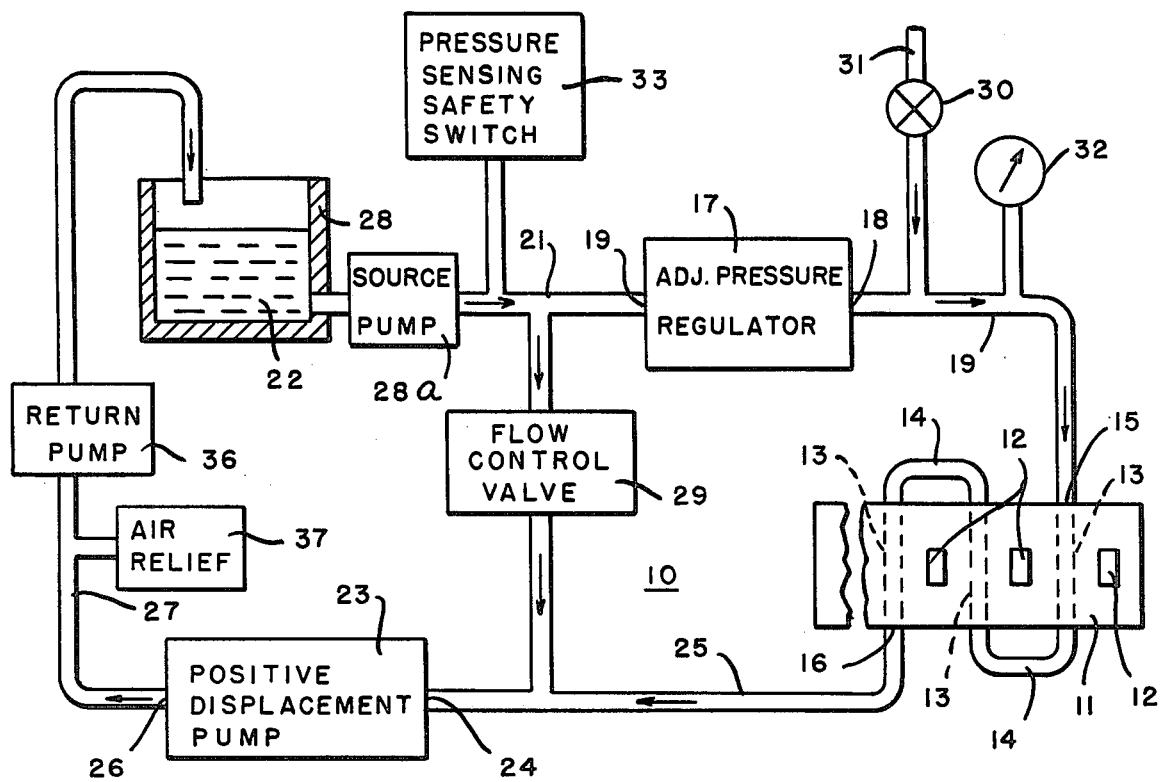
FIG. 1 is a block and schematic diagram of one embodiment of a plastic mold cooling system of the present invention.

Referring to the drawing, the system shown in FIG. 1 is generally indicated by the reference number 10 and is connected to provide cooling of a plastic mold 11 having a diagrammatically shown article molding cavity 12. A cooling duct 13 is shown extending through the mold adjacent the article cavity 12. The mold shown has a plurality of molding cavities 12 and a plurality of cooling ducts 13 with connecting pipes 14 being shown interconnecting the cooling ducts to provide a continuous path of cooling liquid flow through the mold from a feed port 15 to an exit port 16. The feed port 15 into which cooling liquid is introduced into the mold is connected to an adjustable pressure regulator 17 at the outlet 18 end thereof by a pipe 19 while the inlet 20 of the regulator is connected by a pipe 21 to a source of cooling liquid 22.

The exit port 16 of the cooling duct 13 is connected to a positive displacement pump 23 at the inlet 24 thereof by a pipe 25 while the discharge 26 of the pump is directed through a pipe 27 to a container for the source of cooling liquid 22 which in the embodiment shown is an open tank 28 open to the atmosphere. The source of cooling liquid may be that already present in a molding plant and generally includes cooling apparatus for providing a chilled liquid and a pump for pressurizing the liquid in the pipe 21, as indicated by the block 28a.

The present system further includes a flow control valve 29 having an inlet connected to the source through the pipe 21 and an outlet connected to the inlet 24 of the pump 23 so that pressurized liquid may flow through the control valve to the pump inlet for reasons that will hereinafter appear.

Connected to the pipe 19 prior to the feed port 15 of the mold is an air bleed valve 30 which has its inlet open to the atmosphere as at 31 and its output directed into the pipe 19.

The system preferably further incorporates a pressure gauge 32 connected to monitor the pressure of the liquid to the cooling duct feed port 15 and a pressure safety switch 33 connected to the pipe 21. The switch 33 is connected to the electrical supply for the pump 23 and serves to deenergize said pump if the pressure of the cooling liquid from the source drops below a minimum value thereby stopping operation of the system because of a failure of a proper source of cooling liquid.

The pressure regulator 17 is of the pressure reducing and regulating type which reduces the pressure of the liquid from the source and is adjustable to be capable of being set to have, under static conditions, a minimum outlet pressure of 0 PSIG. The valve will stay open for pressures below its set opening and will tend to close if the pressure becomes higher. In use, the valve is set to provide a pressure at the feed port 15 of essentially 0 PSIG with fluid flowing in the system which generally results in the valve having a static pressure setting of slightly more than atmospheric. This higher than minimum setting of the regulator 17 increases the flow of cooling liquid as it compensates for losses in the regulator and places a higher pressure difference between the regulator outlet 18 and the pump inlet 24. However, the setting must maintain the pressure at the feed port 15 at no more than atmospheric. One form of regulating valve 17 that has been found usable is a type D pressure reducing and regulating valve assembly manufactured by Cashco, Inc., Decatur, Ill.

The positive displacement pump 23, as its name implies, is capable of producing a high suction lift on the order of perhaps 27" of Hg. and as it is a positive displacement pump, it pumps a constant volume of fluid per revolution and thus a constant volume per time interval when driven at a usual electric motor speed. Thus, the pump 23 is further capable of pumping both liquid and air and is capable of efficiently operating with just liquid in a range of 10 to 100% of its capacity. One form of pump that has been found satisfactory is a "Moyno" progressive cavity pump manufactured by Robbins and Myers Pump Division, Springfield, Ohio.

In the operation of the system, the capacity of the regulating valve and the capacity of the pump are selected to each have a capacity greater than the volume of flow normally required for the cooling cycle time desired for the mold without a leak. The volume may thus be 20 to 70% of the pump's capacity which assures that the pump will be able to maintain its desired inlet suction pressure. The pipes 19 and 25 are connected to the feed and exit ports 15 and 16, respectively, and the pipes 21 and 27 to the source. The pump 23 is energized and the regulating valve 17 is adjusted to produce a pressure at the feed port 15 of slightly less but no higher than atmospheric with said adjustment being basically necessitated to adapt the system to its present environment to place the entire cooling duct at or below atmospheric pressure. The pump 23, by being a positive displacement pump, is capable of producing a negative pressure of up to a maximum of 27 inches to Hg. and the difference between the pump inlet pressure and the slightly less than atmospheric at the feed port 15 provides the pressure difference that forces the cooling liquid to flow through the mold ducts.

The particular combination of a pressure regulating valve prior to the feed port and a positive displacement, essentially constant volume pump, at the exit port renders the present system uniquely applicable to providing mold cooling in the minimum cooling cycle time. The essence of the present invention is to provide negative pressure in the mold without reducing or restricting the flow of cooling fluid through the mold. The usage of valve 17 and pump 23, by being capable of handling greater liquid flow than the mold normally requires thus makes the mold duct basically the factor that limits the volume of fluid flow. Thus, the system, while obviating air leaks, accordingly permits essentially as much liquid flow through the mold as had occurred when the mold has been connected directly to the source of pressurized fluid.

The pump 23 is capable of functioning efficiently in a range of liquid flow from 10% of its capacity to full capacity. With a normal air leak in the mold that is measurable basically in infrequent drops, the cooling liquid flowing through the pump will remain essentially the same as the pump without the air leak, as the liquid flow is in the intermediate range of the pump's capacity. For large leaks, the cooling ducts set the fluid volume that can flow and the leaking air may displace some cooling fluid.

In some molds, where the pressure difference developed by the present system causes a laminar or less than turbulent flow of cooling liquid, the air valve 30 may be used to assure that the flow is turbulent. Turbulence substantially increases the heat transfer coefficient between the mold and the cooling liquid over a flow that is laminar. The controlled amount of air introduced through the air valve 30 may thus enable the system to achieve the desired cooling time even with a reduced flow of cooling fluid.

The flow control valve 29 which is connected between the pressurized source and the pump inlet provides a flow of liquid through the pump which assures its proper operation by always providing a quantity of liquid to the pump inlet that is at least the minimum required by the pump. Such a connection provides Applicant's system with two important advantages, the first being the ability to connect the system without any special effort to remove air therefrom and secondly the prevention of malfunctioning in case of an abnormally large leak. As to the first advantage, installation of the system merely requires the connection of the different pipes to the source and ports and the flow control valve assures that the pump will be operating within its liquid volume range even when it exhausts the air that is initially present within the system and the mold. As to the abnormally large leaks, which may cause such a large air flow that the liquid to the pump is reduced below its necessary minimum, such a possible pump destroying event is prevented by the flow control valve being set to always provide to the pump inlet a volume of liquid which is at its minimum operating range even if no liquid flows in the pipe 25.

Figure 2:
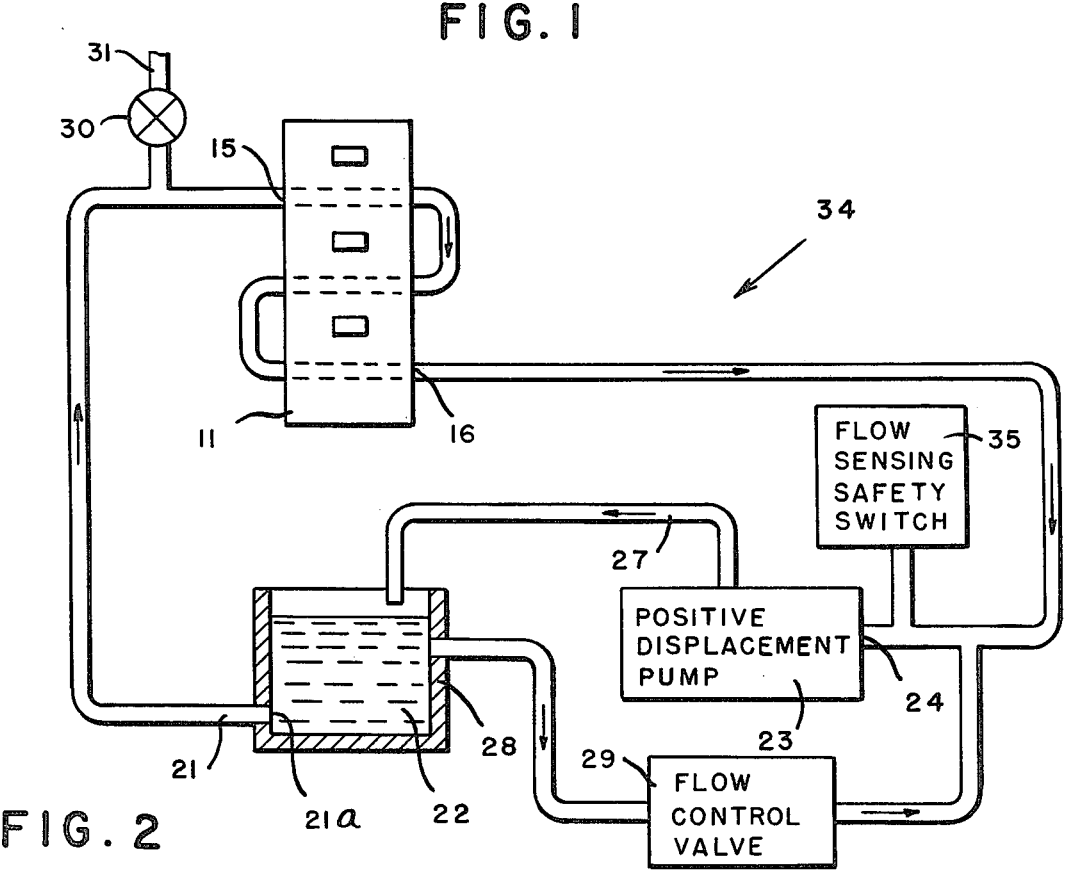
FIG. 2 is a further embodiment thereof.

Shown in FIG. 2 and indicated by the reference numeral 34, is a further embodiment of the present invention in which the pressure regulator valve for reducing the source pressure is substituted by a negative head developed by the relative elevation of the parts. As shown, the inlet 24 of the pump 23 is placed in elevation, higher than the connection of the pipe 21 to the source 22. The pressure at the entrance 21a of the pipe 21 by being in elevation, lower in height than the inlet 24 to the pump 23, will thus have a negative head produced therein which is equal to the difference in height times the weight of the liquid. With such a negative head system, a flow sensing switch indicated by the block 35 may be used in place of the switch 33 to monitor if the pump has the minimum required liquid flow while the flow control valve 29 provides a minimum flow. The air bleed valve 30 may be used as in the prior embodiment, if desired.

The embodiment of the system shown in FIG. 2 performs in the same manner as described in connection with the prior embodiment in that it provides a system for a flow of cooling liquid which is basically limited in volume solely by the capability of the cooling ducts in the mold to restrict the flow while of course providing a negative pressure in the mold cooling ducts to obviate leaks.

Figure 3:
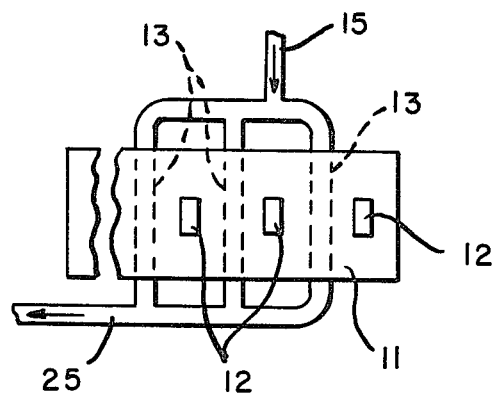
FIG. 3 is an alternative connection to the cooling ducts of the mold.
Figure 4:
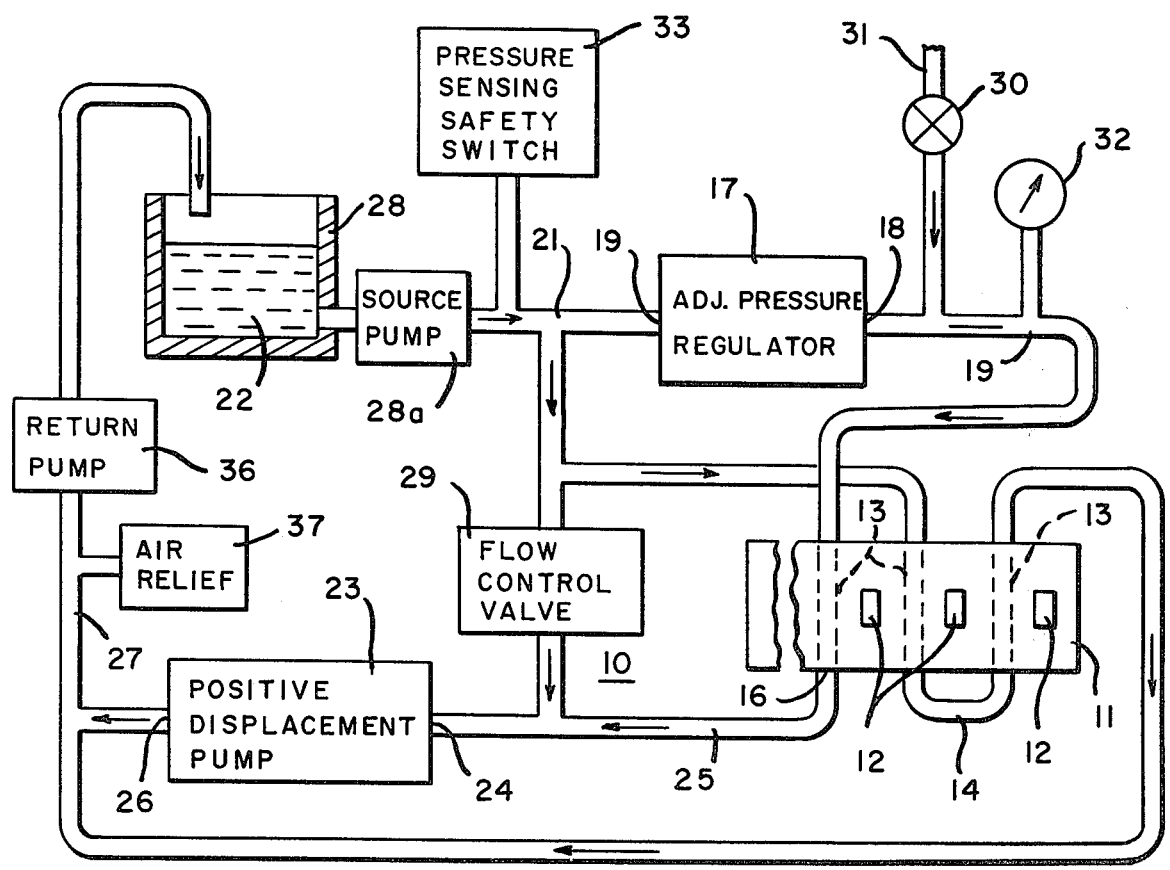
FIG. 4 is an alternative connection to the cooling ducts of the mold.

While the mold shown in both embodiments has a plurality of interconnected cooling ducts to provide a continuous series path for the cooling liquid, the invention contemplates that the ducts may be connected in parallel to provide two or more paths as shown in FIG. 4 wherein only the left most cooling duct is connected to have less than atmospheric pressure therein. In such a situation, the non-leaking ducts may be connected directly to the source and only the leaking ducts connected to the present system as shown in FIG. 3 wherein the three cooling ducts 13 are connected in parallel.

It should be noted that the present system does not utilize settable flow control valves connected to control the flow of cooling liquid as known in the prior art in the references cited, for example, during the prosecution of my abovenoted copending application. Such valve control arrangements particularly where a valve is located on the exit side of the cooling duct inherently limits the flow of fluid to a specific volume. Thus the basic limiting factor as taught by the prior art is to set the volume of flow by valves rather than by the cooling ducts themselves.

When air is mixed with some types of cooling liquids, an undesirable foaming of the liquid may occur especially if the mixed fluids are passed through a return pump, such as the pump 36. An air relief device, indicated by the reference numeral 37, may be provided between the pumps 23 and 36 to separate the air from the cooling liquid and minimize foaming.

It will accordingly be understood that there has been disclosed a system for controlling the flow of liquid in the cooling duct of a plastic mold which obviates unsatisfactory operation caused by a leak in the mold over a wide range of operating conditions and types of molds. The system, while obviating leaks, also enables the mold to generally maintain its same cooling cycle time. This is achieved by the system supplying to the mold, a quantity of liquid which is basically limited by the cooling ducts of the mold in the same manner as in a system operating with positive cooling liquid pressures. Moreover, in some situations where the quantity of flow is so restricted as to not provide the desired cooling time, the time may be decreased by assuring turbulence in the liquid flow, thereby enhancing the transference of heat to the liquid. The turbulence is created by introducing air through an air bleed valve into the liquid flowing into the mold.

Variations and modifications may be made within the scope of the claims and portions of the improvements may be usd without others.

I claim:

1. A system for controlling the flow of cooling liquid in a cooling duct of a plastic mold having a feed port and an exit port comprising a source of cooling liquid, inlet piping means adapted to be connected to the feed port, pressure reducing means connected between the source and the inlet piping means for providing cooling liquid through the inlet piping means at the feed port at a pressure no more than essentially atmospheric, discharge piping means adapted to be connected to the exit port for receiving fluid flowing through the cooling duct, means for receiving cooling fluid and a positive displacement pump means having an inlet connected to the discharge piping means for providing a negative pressure at the exit port and an outlet connected to the means for receiving cooling fluid from the outlet, said pressure reducing means and said pump means having a maximum capacity for fluid flow greater than the desired flow of cooling liquid through the mold whereby the cooling duct of the mold basically determines the quantity of cooling fluid that flows therethrough and in which the system includes minimum flow means connected between the source and the pump means for providing to the pump means at least a constant minimum quantity of cooling liquid.

2. A system for controlling the flow of cooling liquid in a cooling duct of a plastic mold having a feed port and an exit port comprising a source of cooling liquid, inlet piping means adapted to be connected to the feed port, pressure reducing means connected between the source and the inlet piping means for providing cooling liquid through the inlet piping means at the feed port at a pressure no more than essentially atmospheric, discharge piping means adapted to be connected to the exit port for receiving fluid flowing through the cooling duct, means for receiving cooling fluid and a positive displacement pump means having an inlet connected to the discharge piping means for providing a negative pressure at the exit port and an outlet connected to the means for receiving cooling fluid from the outlet, said pressure reducing means and said pump means having a maximum capacity for fluid flow greater than the desired flow of cooling liquid through the mold whereby the cooling duct of the mold basically determines the quantity of cooling fluid that flows therethrough and in which there are means interconnected with the cooling duct for causing the flow of cooling liquid at least in the cooling duct to be turbulent.

3. The invention as defined in claim 2 in which the turbulent producing means includes an adjustable valve having an outlet communicating with the inlet piping means and an inlet communicating with the atmosphere whereby a settable quantity of air may flow into the cooling liquid flowing to the feed port.

4. A system for controlling the flow of cooling liquid in a cooling duct of a plastic mold having a feed port and an exit port comprising a source of cooling liquid, inlet piping means adapted to be connected to the feed port, pressure reducing means connected between the source and the inlet piping means for providing cooling liquid through the inlet piping means at the feed port at a pressure no more than essentially atmospheric, discharge piping means adapted to be connected to the exit port for receiving fluid flowing through the cooling duct, means for receiving cooling fluid and a positive displacement pump means having an inlet connected to the discharge piping means for providing a negative pressure at the exit port and an outlet connected to the means for receiving cooling fluid from the outlet, said pressure reducing means and said pump means having a maximum capacity for fluid flow greater than the desired flow of cooling liquid through the mold whereby the cooling duct of the mold basically determines the quantity of cooling fluid that flows therethrough and in which the pressure reducing means includes a connection to the source that is located at a lower elevational level than the connection of the inlet piping means to the feed port.

* * * * *